INVENTOR
ANTONIO L. GIRARDI
BY Hugh N. Orr
ATTORNEY

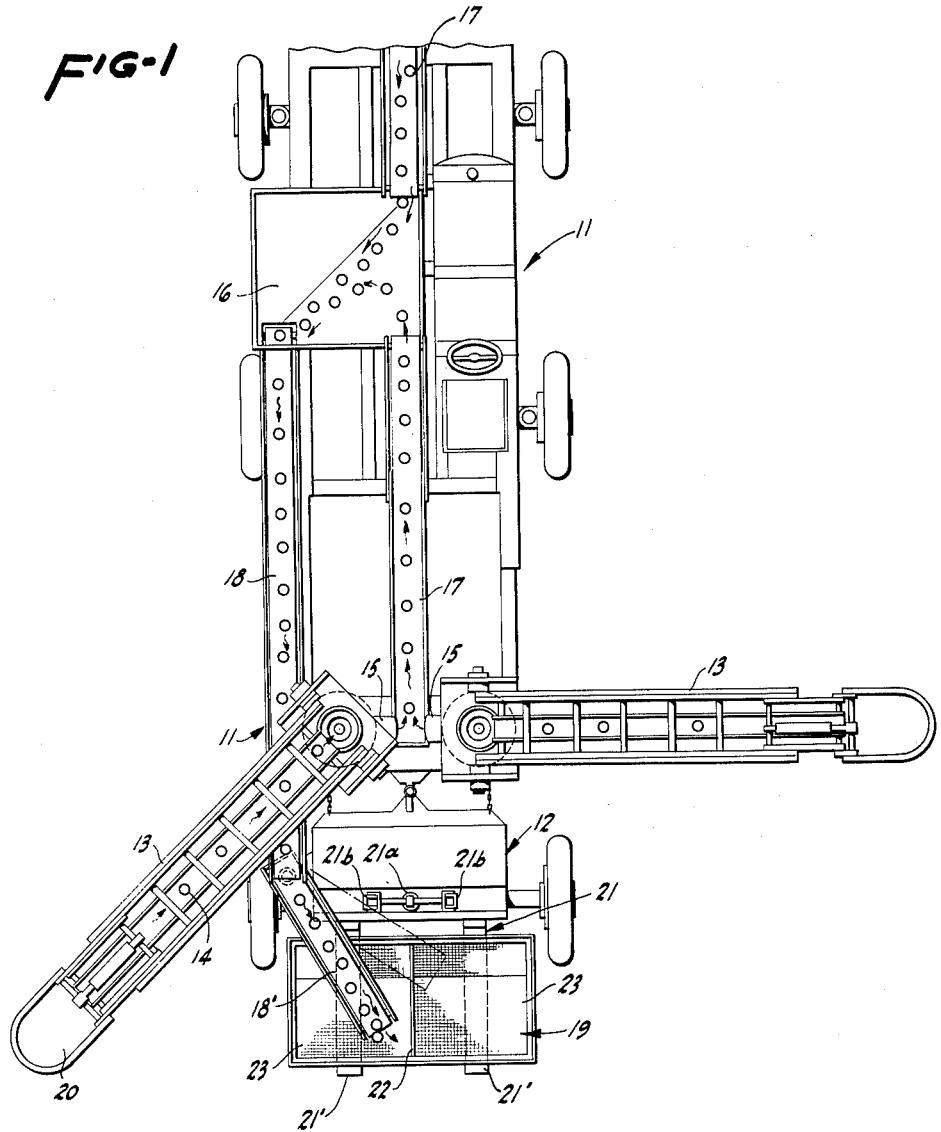

June 28, 1966     A. L. GIRARDI     3,258,142
MACHINE FOR HARVESTING FRUIT
Filed March 25, 1964     3 Sheets-Sheet 3
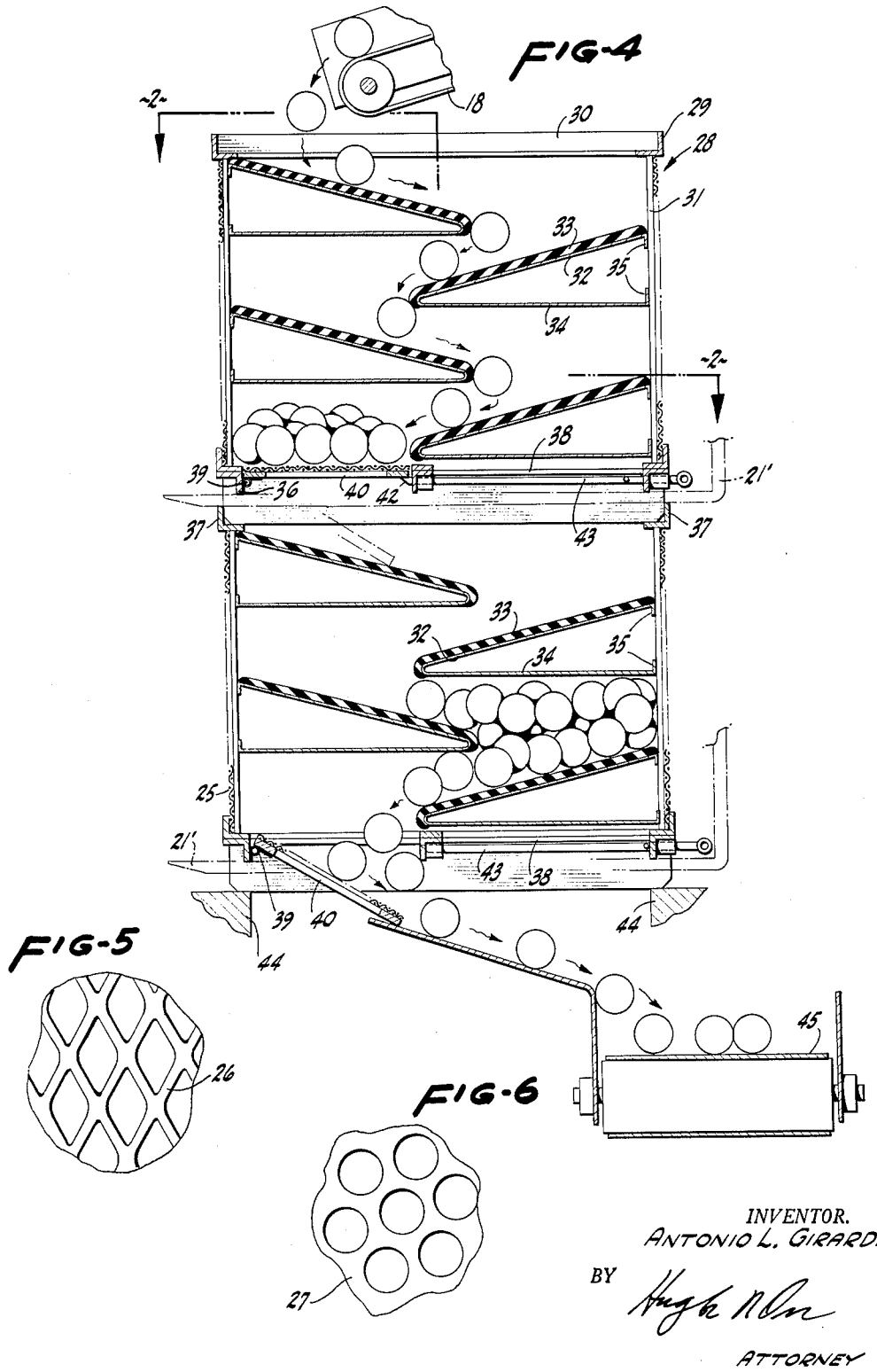
INVENTOR.
ANTONIO L. GIRARDI
BY
ATTORNEY

United States Patent Office 3,258,142
Patented June 28, 1966

3,258,142
MACHINE FOR HARVESTING FRUIT
Antonio Lawrence Girardi, Stockton, Calif.
(758 W. Acacia St., Salinas, Calif.)
Substituted for abandoned application Ser. No. 715,909, Feb. 18, 1958. This application Mar. 25, 1964, Ser. No. 356,691
14 Claims. (Cl. 214—83.1)

This application is a substitute for earlier filed application, Serial No. 715,909, filed February 18, 1958 and now abandoned.

This invention relates to machines for handling fruit as it is harvested.

More particularly, this invention relates to improvements supplementing fruit harvesting mechanisms of the character disclosed in my prior Patents No. 2,798,623, date July 9, 1957, and No. 2,927,705, dated March 8, 1960.

It is among the objects of this invention to provide a fruit harvesting machine provided with fork-lift mechanism operative to raise and lower a receiver to and from a loading position for receiving fruit as it is picked and for containing the fruit as it is transported from an orchard to a packing point.

It is also an object of the present invention to provide a receiver of relatively large capacity into which freshly picked fruit may be delivered, and from which it may be unloaded at a delivery point, with a minimum of bruising and with a minimum exposure to deteriorating influences.

It is a further object to provide fruit handling mechanism for fruit harvesting machines wherein a fork-lift is provided upon the trailing end of a carriage for replaceably supporting receivers of relatively large capacity in position to receive freshly picked fruit, and to deposit the receivers, when filled, along the course of the machine as it progresses through an orchard.

A further object is to provide a receiver for fruit harvesting machines in which surfaces contacted by the fruit are padded to minimize bruising of the fruit.

A still further object is to provide a receiver which will hold a large quantity of fruit in a manner such as to insure adequate ventilation, and to prevent the imposition of excessive weight upon the lower layers of fruit in the receiver.

The invention has other objects and features of advantage, some of which with the foregoing will be explained in connection with the illustrative embodiment of the invention shown in the accompanying drawings forming part of the present specification. It is to be understood that the invention is not limited to the structural features shown in the drawings, as it may be embodied in other forms within the definition of the appended claims.

In the drawings:

FIG. 1 is a fragmental view of a portion of a fruit harvesting machine embodying the improvements of the present invention.

FIG. 4 is a transverse sectional view showing two of the receptacles stacked and illustrating graphically how the receptacles may be loaded and unloaded. The plane of the section corresponds to the plane indicated by the line 4—4 of FIG. 2.

FIGS. 5 and 6 are fragmental views illustrating alternative forms of foraminous material for the receiver wall structure.

Figure 3:
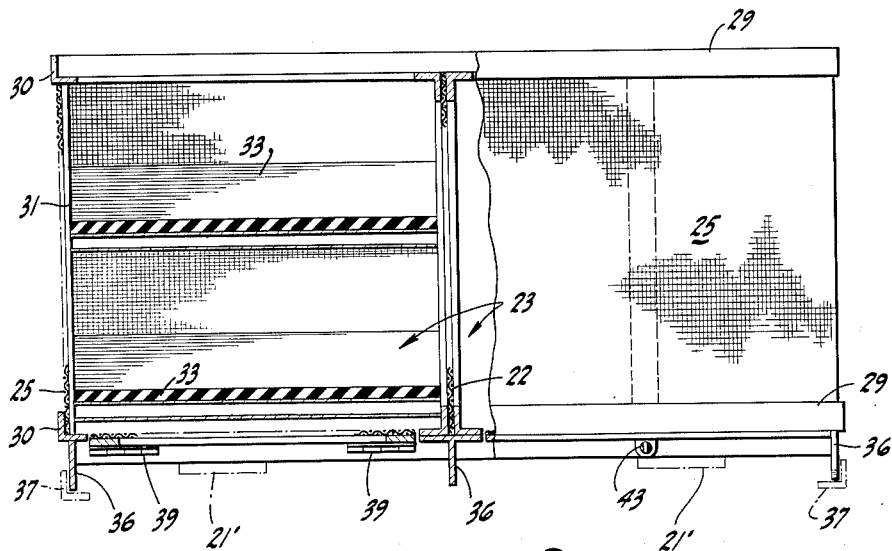
FIG. 3 is a front elevational view of the receiver shown in FIG. 2, parts being broken away and parts being shown in section, as viewed upon planes indicated by the line 3—3 of FIG. 2.
Figure 2:
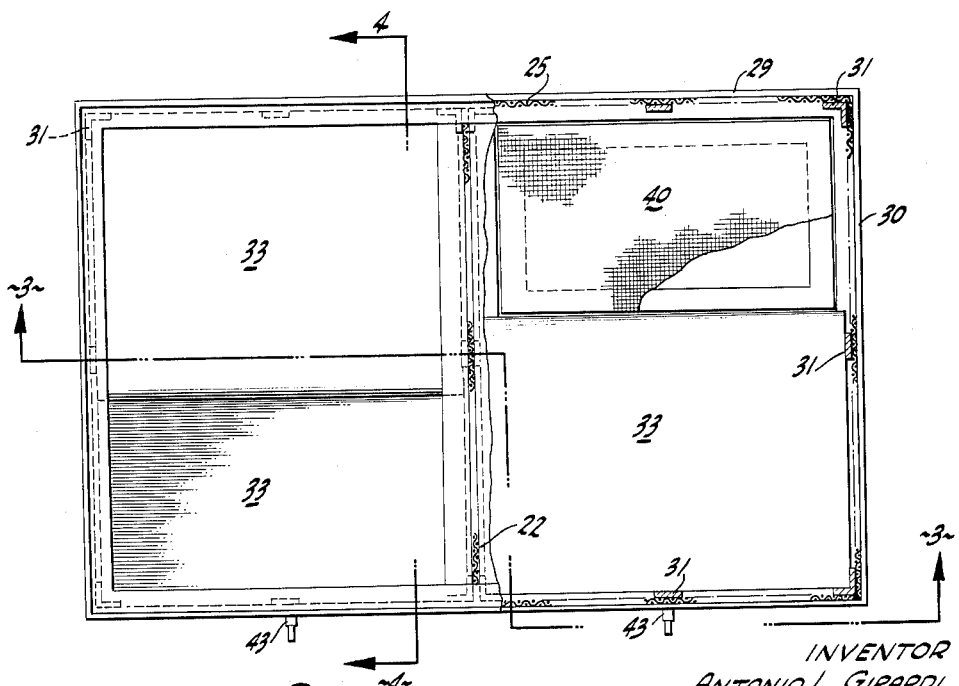
FIG. 2 is a plan view of a fruit receiver constructed in accordance with the present invention, parts being broken away, and parts being shown in horizontal section. The figure shows the parts viewed and sectioned on planes indicated by the line 2—2 of FIG. 4.

In terms of broad inclusion, the device of the present invention comprises a fruit harvesting machine provided with a fork-lift mechanism, operative to raise and lower a fruit receiver of relatively large capacity to and from a loading position at the trailing end of a mobile carriage which is movable along the aisles between the rows of trees of an orchard, the carriage being provided with booms movable to support pickers at desired positions around adjacent trees. The invention also contemplates an improved form and construction of fruit receiver adapted to receive and contain a relatively large amoun . of fruit, the receiver being arranged to minimize damage to the fruit by bruising, by the weight of overlying fruit, or by lack of ventilation.

In terms of greater detail, and in particular reference to the embodiment shown in the drawings, the device of the present invention comprises a fruit harvesting machine of the general character disclosed in my Patent No. 2,798,623 and Patent No. 2,927,705, above referred to. The machine, which is designated in general by the numeral 11, comprises a mobile carriage 12 upon which are mounted extensible booms 13 adjustable through wide angles of vertical, horizontal and angular adjustment, as fully described in my earlier patent and application above identified. Each boom 13 is provided with an extensible conveyor 14 operable along the length of the boom for carrying fruit from a picker's station 20 at the outer end of the boom to a delivery station 15 adjacent its base. As illustrated, the harvesting machine is provided with a grading table 16 to which fruit is delivered by conveyors 17 extending thereto from the delivery stations 15. A conveyor 18 extends longitudinally of the machine 11 to carry fruit from the grading table 16 to a fruit receiver 19 supported upon a fork-lift designated in general by the numeral 21.

Preferably the fork-lift is mounted directly and permanently upon the trailing end of the carriage 12. Alternatively, the fork-lift may be detachably coupled to the carriage as a trailer which may be disconnected when the machine is in use for service other than harvesting. The fork-lift mechanism may be of conventional construction, or of the structure disclosed in my prior Patent No. 2,796,187. Since the structure of the harvesting machine and of the fork-lift mechanism is fully disclosed in the prior patents and application above referred to, and since the details of construction of those mechanisms, aside from the broad combinations herein claimed, is not part of the present invention, a detailed disclosure of specific structure of those mechanisms is herein unnecessary, and is therefore omitted from the present specification and drawings. Broadly, the fork-lift is preferably constructed for operation by a hydraulic ram 21a through a range of movement along upright guides 21b sufficient to lift a receiver to a loading position for receiving fruit from the conveyor 18, and to lower the receiver onto the ground when filled, as the machine 11 progresses along its course through an orchard.

The fruit receiver is of a relatively large size capable of containing a load of picked peaches, or other fruit, is the order of one to two tons. For example, each receiver may be about four feet deep, four feet wide and eight feet long, preferably divided by a partition 22 positioned transversely across the receiver midway between its ends to form two compartments 23 each about four feet square and four feet deep. So dimensioned, each compartment is substantially the equivalent in capacity of a group of ordinary standard lug boxes arranged in tiers of six, stacked six lugs high. The area of each compartment is about equal to that of two rows of lug boxes of standard sixteen inch by twenty four inch size, positioned side by side with their adjacent ends abutting to obtain a combined area of about four feet square. The depth corresponds to a stack of such lugs so arranged, about six deep, peach lugs ordinarily being about eight inches deep. The height of such a stack is about four feet, corresponding to the four foot depth of each compartment 23. The receiver compartments, of course, may be made of greater or lesser depth, preferably corresponding to an equivalent stack of lug boxes stacked in multiples of six arranged in an area of four feet square.

The receivers 19 are constructed of screen 25, or other foraminous material such as expanded metal 26, as shown in FIG. 5, or apertured plate 27, as shown in FIG. 6. The foraminous material is applied to a frame designated in general by the numeral 28, preferably made of angle iron or other suitable structural iron sections, shaped and joined to form side and end rails 29 and 30 at the top and bottom of a receiver, and uprights 31 at the corners. The foraminous material is preferably coated heavily with rubber or other resilient material sprayed or otherwise applied thereto to provide a resilient padding against which fruit may rest with a minimum of injury to the fruit.

Within the receiver 19, and within each compartment 23 thereof when the receiver is divided into compartments by a partition 22, are mounted a plurality of baffles 32 extending in staggered relation from opposite walls of the receiver, as best shown in FIG. 4 of the drawings. The baffles 32 are inclined downwardly at an angle such that fruit delivered into the top of the receiver may roll gently downwardly along the baffles to the lower levels of the receiver. The baffles are preferably surfaced with pads 33 of sponge rubber or other suitable padding material adapted to cushion the fall of fruit from one baffle to the next lower one, so as to prevent bruising of the fruit. The baffles 32 are braced by stays 34 to prevent sagging of the baffles between their ends under the weight of fruit accumulated thereon. As illustrated, the baffles 32 and stays 34 are formed unitarily of a sheet of material bent to provide an inclined baffle and a substantially horizontal brace, as best shown in FIG. 4 of the drawings. Flanges 35 along the edges of the baffles and braces provide means for securing the baffles to the frame, and to give rigidity to the structure.

The frame members forming the bottom rails of the receiver are preferably provided with downwardly extending flanges 36 arranged to nest within flanges 37 formed upon the tops of the top rails of another receiver whereby the receivers may be readily stacked, one upon another for transportation or storage.

The receivers 19 are open at the top, and are provided with bottoms 38 of foraminous material similar to the walls of the receivers. A portion of the bottom, preferably between the inner end of the lowermost baffle and the wall opposite thereto, is hinged, as at 39, to permit a bottom panel 40 to swing downwardly from a normal closed position, as shown in full lines in the upper receiver of FIG. 4 to the open position shown in dotted lines in the upper receiver and in full lines in the lower receiver. The hinged panels 40 of the receivers 19 are normally held in closed position by latches 42 carried by rods 43 extending to the front of the receivers to permit the panels to be opened while the receivers are supported upon an unloading rack 44 or upon another receiver, as indicated in FIG. 4.

In operation, a receiver 19 is placed upon the fork members 21' of the fork-lift 21, mechanically or by workmen, as operating conditions require or permit. The receiver is then lifted by the fork-lift to a loading position where fruit from the conveyor 18 may be delivered into the open top of the receiver and onto the uppermost baffle 32 thereof. Where, as in the preferred embodiment illustrated, the receiver is divided into compartments 23 by the central partition 22, the conveyor 18 may be provided with a pivotally mounted extension 18' arranged to be swung about its pivot mounting to deliver fruit to either compartment, as indicated in full and broken lines in FIG. 1 of the drawings.

As fruit is delivered into the receiver 19, the pieces of fruit roll gently down the baffles from one to another to the lower levels of the receiver. With the bottom panel 40 closed, the fruit accumulates from the bottom up, and is supported in layers by successive baffles from the bottom to the top of the receiver. The space below each baffle is not completely filled, thereby affording ample space for the circulation of air through and around the accumulated fruit. The weight of fruit resting upon each baffle is supported thereby without subjecting it to the weight of the fruit that accumulates in the upper levels of the receiver.

When the receiver is filled, it is lowered onto the ground by the fork-lift 21, and is left behind as the carriage 12 is advanced along its course through an orchard. An empty receiver is placed upon the fork-lift to replace the filled receiver that has been dropped, so that the picked fruit may be delivered substantially continuously into receivers as the machine proceeds through an orchard.

The filled receivers are in due course loaded upon a truck, by fork-lift or otherwise, for transportation to a packing station. Receivers may be stacked one upon another in the orchard, or as they are loaded onto a truck; and they may be moved to an unloading station singly, or in stacked relation, as desired. FIG. 4 is a composite view illustrating in somewhat graphic form: (1) how fruit is delivered to and accumulated in a receiver from a conveyor 18; (2) how receivers may be moved individually by a fork-lift mechanism into stacked relation, and singly or stacked onto an unloading rack 44; and (3) how the hinged bottom panels 40 may be released to open the bottoms of the receivers to deliver fruit directly upon an unloading conveyor 45, or through another receiver upon which the receiver to be emptied has been stacked. When the hinged bottom panel is opened, fruit rolls gently from the bottom of the receiver. As the lower level of fruit is allowed to roll from the receiver, it is replaced by fruit that rolls downwardly over the upper baffles successively until the receiver is emptied. Where two or more receivers are delivered to an unloading station in stacked relation, fruit from the upper receiver may flow through an underlying receiver, as suggested in FIG. 4, until the entire content has been unloaded. In this manner, the load from two or more stacked receivers may be delivered to a packing station with a single placing of the receivers on a delivery rack.

The large size of the receivers of the present invention facilitates the loading, transportation, and emptying operations, and minimizes damage to the fruit by bruising, by the weight of overlying fruit, or by excessive heat due to lack of ventilation. A number of receivers may be stacked upon a truck for transportation with little risk that stacked receivers will topple over, as sometimes happens in stacking the conventional lug boxes in which peaches and similar fruits have heretofore been transported from an orchard to a packing station.

Having thus described my invention, I claim:

1. A mechanism for harvesting and handling fruit comprising a mobile carriage provided with a plurality of extensible booms each provided with an extensible conveyor operable along the length of the boom for carrying fruit from a picker's station at the outer end of each boom to a delivery station adjacent its base, a fork-lift mechanism mounted upon the trailing end of the carriage, means for actuating the fork-lift mechanism independently of the booms, a receiver releasably supported by the fork-lift in fruit receiving position, said receiver being of foraminous hamper-like construction having a capacity in the order of a multiple of six lug boxes, and means for conveying fruit from the delivery stations to the receiver.

2. A portable fruit transporting receptacle of hamper-like form having a fruit receiving compartment of substantially cubic shape with dimensions in the order of four feet and having a capacity in the order of about thirty-six conventional lug boxes, said receptacle having an open top and a closed bottom, a plurality of staggered baffles alternately overhanging each other within the receptacle, brace means extending from walls of the compartment to end portions of the baffles, flanges positioned around the top of the receptacle, shouldered edge portions formed upon the bottom of the receptacle to seat within the flanges of another similar receptacle whereby two receptacles may be securely seated in stacked relation, and a delivery door movably mounted in the bottom of the compartment for movement to open a portion of the bottom opposite the lowermost baffle for permitting fruit to flow by gravity from the compartment to an understacked receptacle.

3. A portable fruit transporting receptacle as defined by claim 2 provided with latch means normally holding the door in a closed position, said latch being movable to release the door to an open position without disturbing the stacked position of the receptacle upon an understacked receptacle.

4. A portable fruit transporting receptacle as defined by claim 2 wherein the receptacle is provided with a partition and is of a size such as to form two fruit receiving compartments, each possessing the characteristics defined by said claim.

5. A portable fruit transporting receptacle as defined by claim 2 wherein the walls and baffles are constructed of foraminous material surfaced with resilient padding material and arranged to facilitate circulation of air through fruit contained in the compartment.

6. A portable fruit transporting receptacle as defined by claim 2 wherein the baffles comprise strips of sheet metal bent to form an acute angle with an upper portion inclining downwardly from a wall of a compartment toward the center and an under portion extending substantially horizontally from the wall to the end portion of the baffle for rigidly resisting displacement of the baffle under a vertical load.

7. An orchard apparatus comprising a mobile carriage provided with an extensible boom movable through wide angles of horizontal and vertical adjustment for supporting a workman in a desired position adjacent an orchard tree while picking fruit therefrom, a portable hamper-like fruit receptacle having an open top and a closed bottom and having a capacity of about one to two tons of fruit, and a fork-lift mounted upon an end of the carriage operable independently of the boom to lift and support the receptacle in a fruit-receiving position during the picking operation and to deliver the receptacle from the apparatus when loaded at a selected delivery point for pick-up by auxiliary apparatus.

8. An orchard apparatus as defined by claim 7 wherein the boom and carriage are provided with power operated extensible conveyors for delivering fruit from the workman to the receptacle.

9. An orchard apparatus as defined by claim 7 provided with a grading area upon the carriage, power operated conveyor means for conveying picked fruit from the workman to the grading area, and power operated conveyor means for conveying graded fruit from the grading area to the receptacle.

10. A portable receiver unit arranged to be replaceably supported upon a mobile orchard apparatus and to be removed therefrom for transporting fruit from the apparatus to a delivery point remote therefrom comprising a substantially rectangular foraminous hamper provided with staggered overhanging baffles inclined to direct fruit gently downwardly from the top of the receiver to the lower levels therein, means bracing said baffles to support fruit accumulating thereon in separately supported layers within the receiver, and means upon the upper and lower edge portions of the receiver interengageable with matching means upon corresponding edge portions of other similar receptacles to resist relative lateral displacement of receivers when stacked one upon another whereby a plurality of receivers may be transported in stacked relation.

11. A portable receiver for use in transporting fruit as defined by claim 10 wherein the foraminous hamper has its walls coated with resilient cushioning material.

12. A portable receiver for use in transporting fruit as defined by claim 10 provided with a bottom panel movable between closed and open positions, said panel being positioned to permit delivery of fruit by gravity through the bottom of the receiver when said panel is in an open position.

13. A portable receiver for use in transporting fruit as defined by claim 10 provided with a transverse vertically disposed partition dividing the receiver into a pair of compartments each provided with staggered baffles.

14. A portable receiver for use in transporting fruit as defined by claim 10 provided with a transverse vertically disposed partition dividing the receiver into a pair of compartments each provided with staggered baffles and each having a delivery opening in the bottom thereof, and panels movably mounted in connection with the bottom of the receiver to independently open and close the delivery openings of the compartments.

References Cited by the Examiner

UNITED STATES PATENTS

| | | | |
|---|---|---|---|
| 2,450,152 | 9/1948 | Miller | 214—83.1 |
| 2,796,187 | 6/1957 | Girardi | 214—731 |
| 2,927,705 | 3/1960 | Girardi | 214—83.1 |

GERALD M. FORLENZA, *Primary Examiner.*

A. J. MAKAY, *Assistant Examiner.*